(12) United States Patent
Shibata et al.

(10) Patent No.: US 12,728,488 B2
(45) Date of Patent: Sep. 8, 2026

(54) STEEL SHEET MEMBER AND METHOD FOR PRODUCING THE SAME

(71) Applicant: TOYOTA JIDOSHA KABUSHIKI KAISHA, Toyota (JP)

(72) Inventors: Motoyuki Shibata, Nisshin (JP); Tomoaki Ihara, Toyota (JP); Shinichiro Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/055,868

(22) Filed: Feb. 18, 2025

(65) Prior Publication Data

US 2025/0269477 A1 Aug. 28, 2025

(30) Foreign Application Priority Data

Feb. 26, 2024 (JP) ................................ 2024-026436

(51) Int. Cl.
*B23P 19/02* (2006.01)
*B21D 22/26* (2006.01)

(52) U.S. Cl.
CPC .............. *B23P 19/02* (2013.01); *B21D 22/26* (2013.01); *B23P 2700/14* (2013.01); *B60G 2206/81062* (2013.01); *B60G 2206/83* (2013.01)

(58) Field of Classification Search
CPC ..... B21D 53/88; B21D 22/26; B23P 2700/14; B23P 19/02; B60G 2206/81062; B60G 2206/8201; B60G 2206/83
See application file for complete search history.

(56) References Cited

U.S. PATENT DOCUMENTS

2018/0043412 A1* 2/2018 Isogai .................... B21D 28/26
2020/0239974 A1 7/2020 Ihara et al.
2022/0219220 A1* 7/2022 Ihara ...................... B21D 28/26

FOREIGN PATENT DOCUMENTS

DE 3921468 C1 * 5/1990 ............. B60G 7/001
JP 2020-116635 A 8/2020

OTHER PUBLICATIONS

Machine Translation of DE 3921468 C1 (Year: 1990).*
MatWeb Data Sheet for 1180 Steel (Year: 2025).*

* cited by examiner

*Primary Examiner* — Christopher J. Besler
(74) *Attorney, Agent, or Firm* — SoraIP, Inc.

(57) ABSTRACT

A method of manufacturing a steel sheet member according to an aspect of the present disclosure includes: a step of forming a flange portion by burring a peripheral edge portion after induction heating of a peripheral edge portion of a through-hole formed in a first steel sheet to remove strain; and a step of press-fitting a bush into the flange portion with the integrated first steel sheet and the second steel sheet facing each other with the flange portion facing inward. In the step of forming the flange portion, in the step of stretching the flange portion by repeating induction heating and burring processing of the peripheral portion, and press-fitting the bush, a through hole or a cutout portion through which the bush passes is provided in a portion of the second steel sheet facing the flange portion, and the bush is supported only by the flange portion.

5 Claims, 3 Drawing Sheets

STEEL SHEET MEMBER AND METHOD FOR PRODUCING THE SAME

CROSS-REFERENCE TO RELATED APPLICATION

This application claims priority to Japanese Patent Application No. 2024-026436 filed on Feb. 26, 2024, incorporated herein by reference in its entirety.

BACKGROUND

1. Technical Field

The present disclosure relates to a steel sheet member and a method for producing the same.

2. Description of Related Art

As disclosed in Japanese Unexamined Patent Application Publication No. 2020-116635 (JP 2020-116635 A), the inventors have developed a method of removing strain by induction heating of a peripheral edge of a through hole formed in a steel sheet by punching, and then burring the peripheral edge. The burring is also referred to as stretch flanging.

SUMMARY

The inventors have studied a method for producing a steel sheet member in which flange portions of a pair of steel sheets that are formed by burring face each other and a bush is press-fitted into the flange portions that face each other. In such a steel sheet member, the flange portions that face each other need to be coaxial. There is a problem that the production is difficult.

The present disclosure has been made in view of such circumstances, and provides a method for producing a steel sheet member in which a pair of flange portions that faces each other need not be coaxial and production is easy.

A method for producing a steel sheet member according to an aspect of the present disclosure includes:

forming a flange portion by burring a peripheral edge of a through hole formed in a first steel sheet after removing strain by induction heating of the peripheral edge; and press-fitting a bush to the flange portion while the first steel sheet and a second steel sheet integrated together face each other with the flange portion positioned on an inner side.

In the forming of the flange portion, the flange portion is stretched by repeating the induction heating and the burring of the peripheral edge.

In the press-fitting of the bush, a portion of the second steel sheet that faces the flange portion has a through hole or a cutout portion through which the bush passes, and the bush is supported only by the flange portion.

In the method for producing the steel sheet member according to the aspect of the present disclosure, in the forming of the flange portion on the first steel sheet, the flange portion is stretched by repeating the induction heating and the burring. In the press-fitting of the bush to the flange portion, the portion of the second steel sheet that faces the flange portion of the first steel sheet has the through hole or the cutout portion through which the bush passes, and the bush is supported only by the flange portion of the first steel sheet. Therefore, a pair of flange portions that faces each other need not be coaxial and the steel sheet member is easy to produce.

The method may further include, after the forming of the flange portion and before the press-fitting of the bush, welding the first steel sheet and the second steel sheet to each other while the first steel sheet and the second steel sheet face each other with the flange portion positioned on the inner side. With such a configuration, even in the welding, a pair of flange portions that faces each other need not be coaxial and the steel sheet member is easy to produce.

The first steel sheet and the second steel sheet may each be made of one flat sheet. After the forming of the flange portion and before the press-fitting of the bush, the flat sheet may be formed into a C-shape in cross section with the flange portion positioned on the inner side, and the first steel sheet and the second steel sheet may be caused to face each other. With such a configuration, the welding can be omitted, and the steel sheet member can be produced more easily.

During the induction heating of the peripheral edge, an induction heating coil may be inserted into the through hole. With the simple configuration, the peripheral edge of the through hole can be heated.

A steel sheet member according to an aspect of the present disclosure includes:

a first steel sheet having a through hole and including a flange portion rising from a peripheral edge of the through hole;

a second steel sheet disposed to face the flange portion side of the first steel sheet; and a bush press-fitted to the flange portion.

In the steel sheet member, the first steel sheet and the second steel sheet are integrated together.

A portion of the second steel sheet that faces the flange portion has a through hole or a cutout portion through which the bush passes, and the bush is supported only by the flange portion.

In the steel sheet member according to the aspect of the present disclosure, the portion of the second steel sheet that faces the flange portion of the first steel sheet has the through hole or the cutout portion through which the bush passes, and the bush is press-fitted to and supported by only the flange portion of the first steel sheet. Therefore, a pair of flange portions that faces each other need not be coaxial and the steel sheet member is easy to produce.

According to the present disclosure, it is possible to provide the method for producing the steel sheet member in which a pair of flange portions that faces each other need not be coaxial and production is easy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments of the present disclosure will be described in detail with reference to the drawings. However, the present disclosure is not limited to the following embodiments. The following description and drawings are simplified as appropriate for the sake of clarity.

First Embodiment

Configuration of Steel Sheet Member

Figure 1:
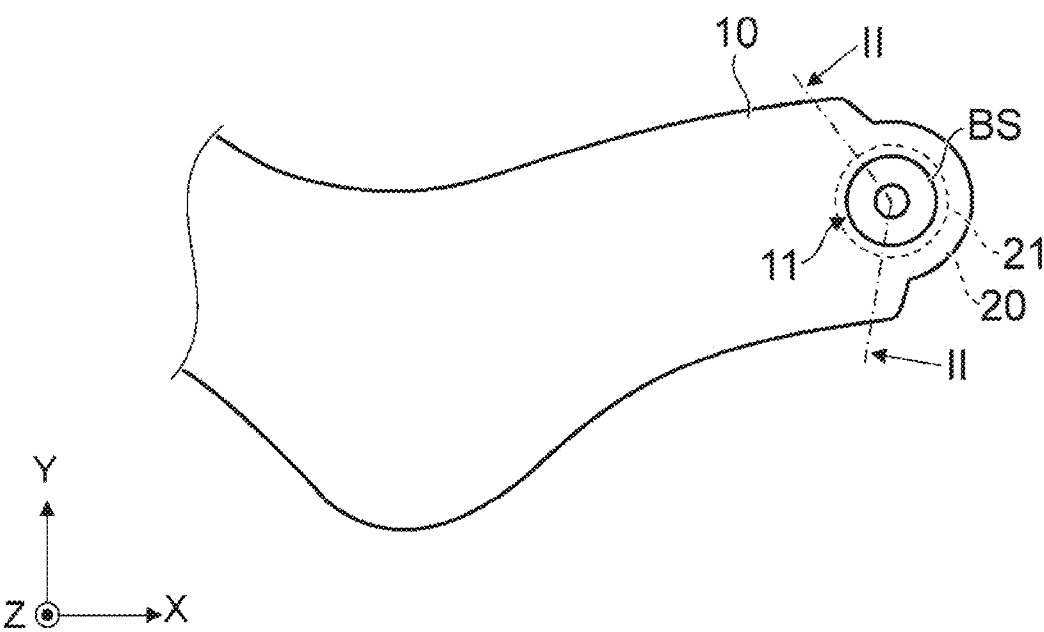
FIG. 1 is a partial plan view of a steel sheet member according to a first embodiment.
Figure 2:
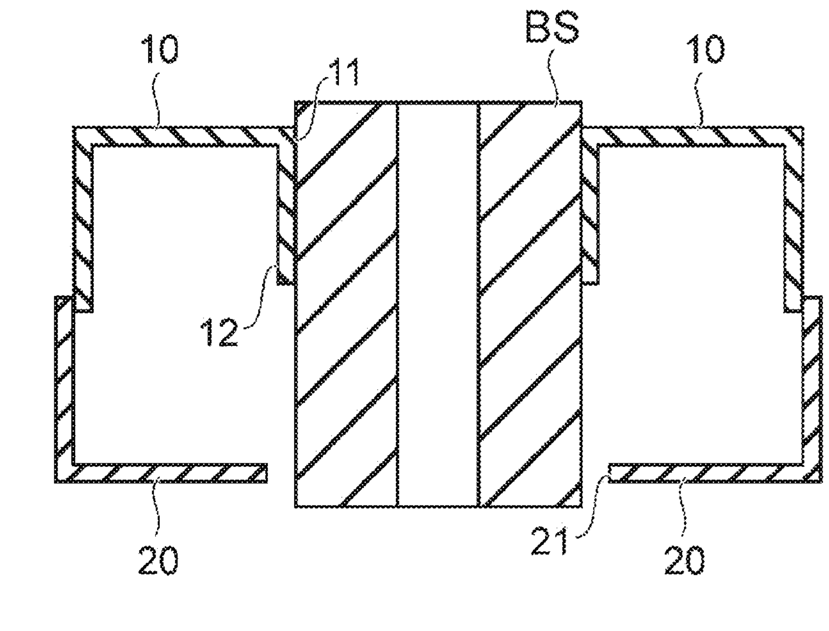
FIG. 2 is a cross-sectional view taken along II-II line of FIG. 1.

First, the configuration of the steel sheet member according to the first embodiment will be described with reference to FIGS. 1 and 2. FIG. 1 is a partial plan view of a steel sheet member according to a first embodiment. FIG. 2 is a cross-sectional view taken along II-II line of FIG. 1. The steel sheet members shown in FIGS. 1 and 2 are not particularly limited, but are, for example, steel sheet members for automobiles, and more specifically, are suspension arms such as a rear upper arm, a rear lower arm, a front upper arm, and a front lower arm.

It should be understood that the right-hand system XYZ Cartesian coordinates illustrated in FIGS. 1 and 2 are for convenience of describing the positional relation of the constituent elements. In FIG. 1 and the like, the Z-axis positive direction is vertically upward and XY plane is a horizontal plane, which is the same among the drawings. The steel sheet member shown in FIG. 1 extends in a predetermined direction and has a bent portion, but is not particularly limited.

The steel sheet member shown in FIGS. 1 and 2 includes a first steel sheet 10, a second steel sheet 20, and a bushing BS.

A through hole 11 is formed in an end portion of the first steel sheet 10. As shown in FIG. 2, the cylindrical flange portion 12 rises downward (in the negative z-axis direction) from the peripheral edge portion of the through-hole 11. As shown in FIGS. 1 and 2, a cylindrical bushing BS is press-fitted into the flange portion 12.

The through hole 11 is formed, for example, by punching the first steel sheet 10. The flange portion 12 is formed by performing burring processing on the peripheral portion of the through-hole 11 after the peripheral portion is induction-heated to remove the strain.

Here, the flange portion 12 is extended by repeatedly performing induction heating and burring processing on the peripheral portion of the through-hole 11. For example, by inserting a cylindrical induction heating coil into the through-hole 11, the peripheral portion of the through-hole 11 is induction-heated. With the simple configuration, the peripheral portion of the through-hole 11 can be effectively heated. The heating conditions are, for example, a heating temperature of about 500 to 830° C. and a heating time of 10 seconds or less. However, the heating time may be more than 10 seconds.

The second steel sheet 20 is disposed to face the flange portion 12 side of the first steel sheet 10. In the second steel sheet 20, a through hole 21 through which the bushing BS passes is provided in a portion of the first steel sheet 10 facing the flange portion 12. Therefore, the bushing BS is supported only by the flange portion 12 of the first steel sheet 10. The through hole 21 is formed, for example, by punching the second steel sheet 20.

Figure 3:
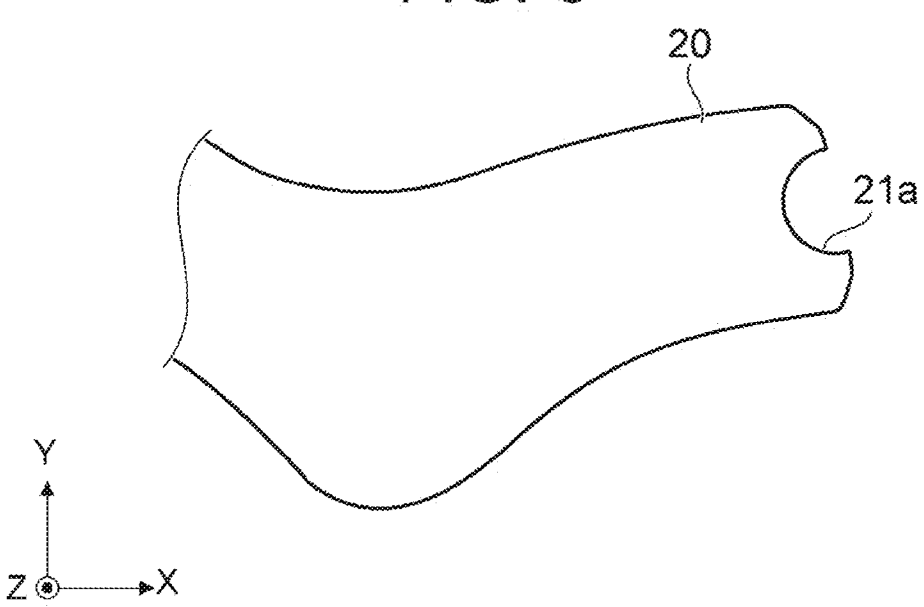
FIG. 3 is a partial plan view showing a modification of the second steel sheet 20.

Here, FIG. 3 is a partial plan view showing a modification of the second steel sheet 20. In the modification of the second steel sheet 20 shown in FIG. 3, a cutout portion 21*a* through which the bushing BS passes is provided at a portion of the first steel sheet 10 facing the flange portion 12. As described above, the through-hole 21 shown in FIG. 1 or the cutout portion 21*a* shown in FIG. 3 is provided at a portion of the second steel sheet 20 that faces the flange portion 12 of the first steel sheet 10.

As described above, in the steel sheet member according to the present embodiment, the second steel sheet 20 is not provided with the flange portion for supporting the bushing BS, and the through hole 21 shown in FIG. 1 or the cutout portion 21*a* shown in FIG. 3 is provided. Therefore, it is not necessary to make the pair of opposed flange portions coaxial, and it is easy to manufacture the steel sheet member.

The first steel sheet 10 and the second steel sheet 20 are not particularly limited, but are, for example, high-strength steel sheets having a thickness of about 0.5 to 10 mm and a tensile strength 780 MPa or more.

As shown in FIG. 2, the first steel sheet 10 and the second steel sheet 20 are formed in a square U shape in a cross section in the width direction. Both end portions in the width direction of the first steel sheet 10 and the second steel sheet 20 are welded, and the first steel sheet 10 and the second steel sheet 20 are integrated. That is, the steel sheet member is a rectangular tubular member.

In the example shown in FIG. 2, both end portions in the width direction of the first steel sheet 10 and the second steel sheet 20 are overlapped and welded to each other, but there is no particular limitation. For example, both end portions in the width direction of the first steel sheet 10 and the second steel sheet 20 may be butted and welded.

In addition, as described in detail in the second embodiment, the first steel sheet 10 and the second steel sheet 20 that face each other may be formed of one flat plate.

As described above, in the steel sheet member according to the present embodiment, the through hole 21 or the cutout portion 21*a* through which the bushing BS passes is provided in a portion of the second steel sheet 20 that faces the flange portion 12 of the first steel sheet 10. The bushing BS is press-fitted and supported only in the flange portion 12 of the first steel sheet 10. That is, in the steel sheet member according to the present embodiment, since the flange portion for supporting the bushing BS is not provided in the second steel sheet 20, the pair of opposed flange portions do not need to be coaxial, and the steel sheet member is easily manufactured.

Production Method of Steel Sheet Member

Figure 4:
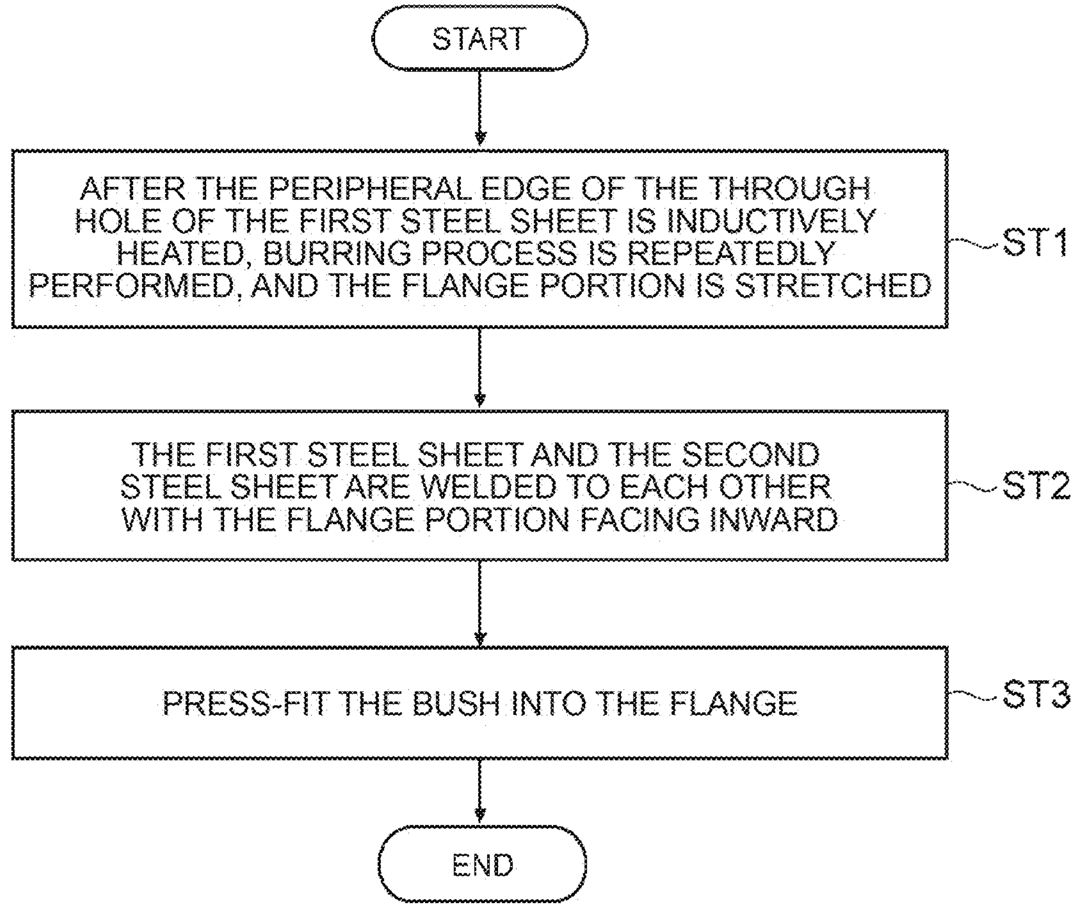
FIG. 4 is a flowchart illustrating a method of manufacturing a steel sheet member according to the first embodiment.

Next, a method of manufacturing the steel sheet member according to the first embodiment will be described with reference to FIG. 4. FIG. 4 is a flowchart illustrating a method of manufacturing a steel sheet member according to the first embodiment.

First, as shown in FIG. 4, after the peripheral edge portion of the through-hole 11 formed in the first steel sheet 10 is inductively heated, the burring process is repeated to extend the flange portion 12 (ST1). For example, a cylindrical induction heating coil is inserted into the through-hole 11, and after the peripheral edge portion of the through-hole 11 is induction-heated to remove the strain, the burring processing of the peripheral edge portion is repeated.

On the other hand, a through hole 21 shown in FIG. 1 or a cutout portion 21*a* shown in FIG. 3 is provided in a portion of the second steel sheet 20 facing the flange portion 12.

Next, as shown in FIG. 4, the first steel sheet 10 and the second steel sheet 20 are ST2 to each other with the flange portion 12 facing inward. More specifically, as shown in FIG. 2, both end portions in the width direction of the first steel sheet 10 and the second steel sheet 20 are welded to integrate the first steel sheet 10 and the second steel sheet 20.

Finally, as shown in FIG. 4, the bushing BS is press-fitted into the flange portion 12 of the first steel sheet 10 (ST3). At this time, the portion of the second steel sheet 20 that faces the flange portion 12 is provided with the through-hole 21 shown in FIG. 1 or the cutout portion 21*a* shown in FIG. 3, and the bushing BS is supported only by the flange portion 12 of the first steel sheet 10.

As described above, in the method for manufacturing a steel sheet member according to the present embodiment, in the step of forming the flange portion 12 on the first steel sheet 10, the induction heating and the burring processing are repeated to extend the flange portion 12. In the step of press-fitting the bushing BS into the flange portion 12, a through hole 21 or a cutout portion 21*a* through which the bushing BS passes is provided in a portion of the second steel sheet 20 facing the flange portion 12 of the first steel sheet 10. In the step of press-fitting the bushing BS into the flange portion 12, the bushing BS is supported only by the flange portion 12 of the first steel sheet 10. That is, in the manufacturing process of the steel sheet member according to the present embodiment, since the flange portion for supporting the bushing BS is not provided in the second steel sheet 20, the pair of opposed flange portions do not need to be coaxial, and the steel sheet member is easily manufactured.

Second Embodiment

Configuration of Steel Sheet Member

Figure 5:
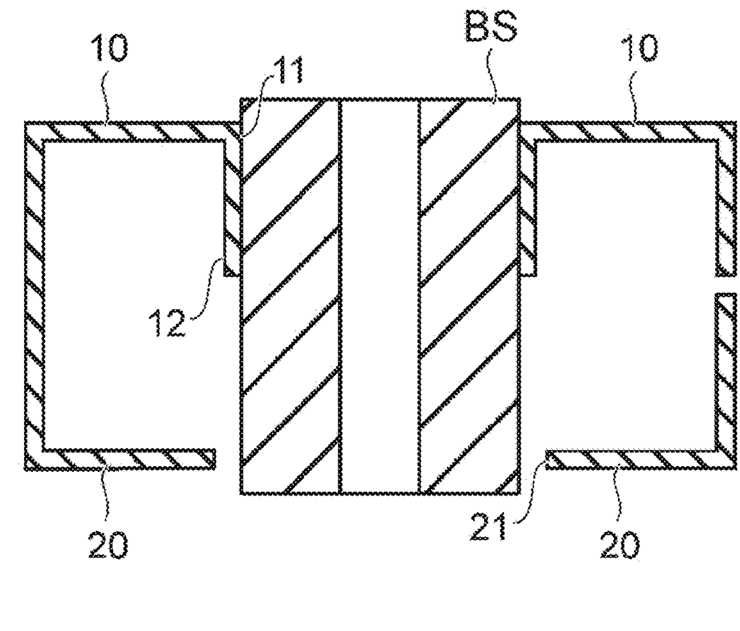
FIG. 5 is a cross-sectional view of a steel sheet member according to a second embodiment.

Next, the configuration of the steel sheet member according to the second embodiment will be described with reference to FIG. 5. FIG. 5 is a cross-sectional view of a steel sheet member according to a second embodiment. FIG. 5 is a cross-sectional view corresponding to FIG. 2 according to the first embodiment.

The planar configuration of the steel sheet member according to the second embodiment is the same as the planar configuration of the steel sheet member according to the first embodiment shown in FIG. 1.

In the steel sheet member shown in FIG. 2, the first steel sheet 10 and the second steel sheet 20 are welded and integrated, but in the steel sheet member shown in FIG. 5, the first steel sheet 10 and the second steel sheet 20 are composed of one flat plate. That is, in the steel sheet member shown in FIG. 5, the first steel sheet 10 and the second steel sheet 20 are integrated in the first place.

In the steel sheet member shown in FIG. 5, as in the first embodiment, the flange portion 12 is provided in the first steel sheet 10 in one flat plate, and the through hole 21 is provided in the second steel sheet 20 in one flat plate.

As shown in FIG. 5, one flat plate is formed in a C-shape in a cross section in the width direction so that the first steel sheet 10 and the second steel sheet 20 face each other with the flange portion 12 facing the inside. Therefore, in the steel sheet member according to the present embodiment, the welding process of the first steel sheet 10 and the second steel sheet 20 in the first embodiment can be omitted, and the steel sheet member can be more easily manufactured. In addition, the manufacturing cost and time can be reduced. In FIG. 5, the opening portion having a C-shaped cross section is provided on the side surface of the steel sheet member, but is not particularly limited, and may be provided on the bottom surface, that is, the second steel sheet 20, for example.

Here, in the second steel sheet 20, a through-hole 21 through which the bushing BS passes is provided in a portion of the first steel sheet 10 facing the flange portion 12. Therefore, the bushing BS is supported only by the flange portion 12 of the first steel sheet 10.

Instead of the through-hole 21, a cutout portion 21*a* shown in FIG. 3 may be provided.

Other configuration, because it is the same as the first embodiment, the description will be omitted.

As described above, in the steel sheet member according to the present embodiment as well, a through hole 21 or a cutout portion 21*a* through which the bushing BS passes is provided in a portion of the second steel sheet 20 facing the flange portion 12 of the first steel sheet 10. The bushing BS is press-fitted and supported only in the flange portion 12 of the first steel sheet 10. That is, also in the steel sheet member according to the present embodiment, since the flange portion for supporting the bushing BS is not provided in the second steel sheet 20, the pair of opposed flange portions do not need to be coaxial, and the steel sheet member is easily manufactured.

In the steel sheet member according to the present embodiment, the first steel sheet 10 and the second steel sheet 20 are formed of one flat plate. Therefore, the welding process of the first steel sheet 10 and the second steel sheet 20 in the first embodiment can be omitted, and the steel sheet member can be more easily manufactured. In addition, the manufacturing cost and time can be reduced.

Production Method of Steel Sheet Member

Figure 6:
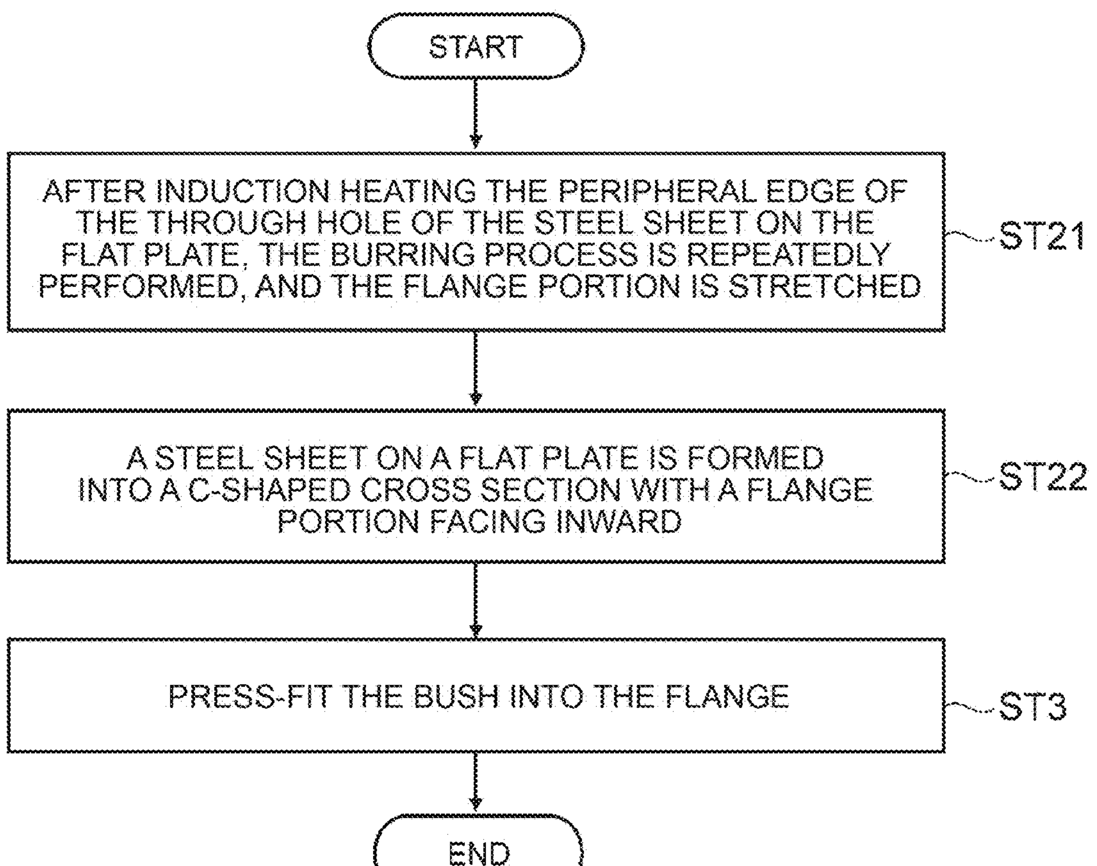
FIG. 6 is a flowchart illustrating a method of manufacturing a steel sheet member according to the second embodiment.

Next, a method of manufacturing the steel sheet member according to the second embodiment will be described with reference to FIG. 6. FIG. 6 is a flowchart illustrating a method of manufacturing a steel sheet member according to the second embodiment.

First, as shown in FIG. 6, after the peripheral edge of the through-hole 11 formed in the portion corresponding to the first steel sheet 10 in one flat plate is induction-heated, the burring process is repeated to extend the flange portion 12 (ST21).

On the other hand, a portion corresponding to the second steel sheet 20 in one flat plate and opposed to the flange portion 12 in ST22 is provided with a through hole 21 shown in FIG. 5 or a cutout portion 21*a* shown in FIG. 3.

Next, as shown in FIG. 6, with the flange portion 12 facing inward, the portion corresponding to the first steel sheet 10 in one flat plate and the portion corresponding to the second steel sheet 20 so as to face each other, the one flat plate is formed into a C-shape in the cross section in the width direction (ST22). Therefore, the welding process of the first steel sheet 10 and the second steel sheet 20 in the first embodiment can be omitted, and the steel sheet member can be more easily manufactured. In addition, the manufacturing cost and time can be reduced.

Finally, as shown in FIG. 6, the bushing BS is press-fitted into the flange portion 12 of the first steel sheet 10 (ST3). At this time, in the portion of the second steel sheet 20 facing the flange portion 12, a through hole 21 shown in FIG. 5 or a cutout portion 21*a* shown in FIG. 3 is provided, and the bushing BS is supported only by the flange portion 12. This ST3 is the same as that of the first embodiment.

Other configuration, because it is the same as the first embodiment, the description will be omitted.

As described above, also in the method of manufacturing the steel sheet member according to the present embodiment, in the step of forming the flange portion 12 on the first steel sheet 10, the induction heating and the burring processing are repeated to extend the flange portion 12. In the step of press-fitting the bushing BS into the flange portion 12, a through hole 21 or a cutout portion 21*a* through which the bushing BS passes is provided in a portion of the second steel sheet 20 facing the flange portion 12 of the first steel sheet 10. In the step of press-fitting the bushing BS into the flange portion 12, the bushing BS is supported only by the flange portion 12 of the first steel sheet 10. That is, in the manufacturing process of the steel sheet member according to the present embodiment, since the flange portion for supporting the bushing BS is not provided in the second steel sheet 20, the pair of opposed flange portions do not need to be coaxial, and the steel sheet member is easily manufactured.

In the method for manufacturing a steel sheet member according to the present embodiment, the first steel sheet 10 and the second steel sheet 20 are formed of a single flat plate. Therefore, the welding process of the first steel sheet 10 and the second steel sheet 20 in the first embodiment can be omitted, and the steel sheet member can be more easily manufactured. In addition, the manufacturing cost and time can be reduced.

Note that the present disclosure is not limited to the above-described embodiment, and can be appropriately modified without departing from the spirit thereof.

What is claimed is:

1. A method for producing a steel sheet member, the method comprising:

forming a flange portion by burring a peripheral edge of a through hole formed in a first steel sheet after removing strain by induction heating of the peripheral edge;

stretching the flange portion by repeating the induction heating and the burring of the peripheral edge to form a stretched flange portion;

welding a first end portion and a second portion of the first steel sheet to a first end portion and a second end portion of a second steel sheet, respectively, while the first steel sheet and the second steel sheet face each other with the stretched flange portion positioned on an inner side; and press-fitting a bushing to the stretched flange portion, wherein:

during the induction heating, an induction heating coil is inserted into the through hole of the first steel sheet;

the first end portion and the second end portion of the first steel sheet are opposing end portions of the first steel sheet in a width direction of the first steel sheet;

the first end portion and the second end portion of the second steel sheet are opposing end portions of the second steel sheet in a width direction of the second steel sheet;

a portion of the second steel sheet that faces the stretched flange portion has a cutout portion through which the bushing passes;

after the press-fitting, the bushing is supported by the stretched flange portion;

after the press-fitting, the bushing is positioned within the cutout portion and the bushing is not supported by the portion of the second steel sheet that has the cutout portion; and the first steel sheet and the second steel sheet are steel sheets having a thickness of from 0.5 to 10 mm and a tensile strength of 780 MPa or more.

2. The method according to claim 1, wherein:

the first steel sheet is made of a flat sheet and the second steel sheet is made of an other flat sheet; and after the forming of the stretched flange portion and before the press-fitting of the bushing, the flat sheet of the first steel sheet is formed into a C-shape in cross section with the stretched flange portion positioned on the inner side, and the first steel sheet and the second steel sheet are caused to face each other.

3. The method according to claim 1, wherein the steel sheet member defines a rectangular tubular member with the first steel sheet and the second steel sheet disposed opposite each other.

4. The method according to claim 1, wherein an area of an opening formed by the cutout portion of the second steel sheet is larger than an area of an opening formed by the flange portion of the first steel sheet.

5. The method according to claim 1, wherein the second steel sheet does not include a flange portion rising from a peripheral edge of the cutout portion.

* * * * *